G. Wilson,
Treating Diseased Sheep.
Nº 76,869. Patented Apr. 14, 1868.

Witnesses.
Andrew Whitley
R. S. Turner

Geo. Wilson Inventor.
By his atty
R. D. Smith

United States Patent Office.

GEORGE WILSON, OF NEW LEXINGTON, OHIO.

Letters Patent No. 76,869, dated April 14, 1868.

MODE OF TREATMENT OF FOOT-ROT AND OTHER DISEASES IN SHEEP.

*The Schedule referred to in these Letters Patent and making part of the same.*

TO ALL WHOM IT MAY CONCERN:

Be it known that I, GEORGE WILSON, of New Lexington, in the county of Perry, and State of Ohio, have invented a new and useful Improvement in Mode of Treatment for Foot-Rot and other Diseases in Sheep; and I do hereby declare the following to be a full, clear, and exact description of the same, reference being had to the accompanying drawings, in which—

Figure 1:
Figure 1 represents a front view of a sheep's foot, with the toes spread apart to show the orifice of the "biflex canal."
Figure 2:
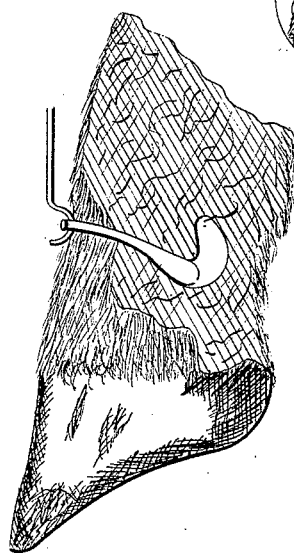
Figure 2 represents a section of the sheep's foot through the cleft, to exhibit the position, &c., of the "biflex canal."
Figure 3:

Figure 3 exhibits the mode of separating and removing the said canal.

The disease called "foot-rot" has been known to shepherds for ages, but has hitherto been considered mysterious, and more or less unmanageable. Various causes have been assigned for its origin, and various remedies have been proposed, but no one hitherto, so far as known to me, has discovered any method of treatment which could claim to bestow more than temporary and uncertain relief.

Experience has satisfied me that the true cause of the disease has not before been discovered, and that therefore all attempts at treatment have been necessarily experimental, and at best resulting in only temporary relief.

The symptoms of the disease may be briefly enumerated. The sheep becomes dull and languid; the wool loses its elasticity, and becomes matted to the sheep in parts pressed upon when lying down; the head droops, and the sheep is indisposed to move often, shaking the head before starting to walk, and when walking shows signs of stiffness in the limbs, and more or less lameness or actual limping. Examine the hoof, and it appears hard, jagged, and rough. The whole foot is hot, the joint is swollen, and the biflex canal, which in health secretes a yellowish limpid fluid, is now filled with a gummy, cheesy matter, of offensive smell. If no remedial measures are adopted, the inflammation continues, and the foot begins to slough. The sheep, for some time, continues to consume its usual amount of food, but finally loses flesh rapidly and dies.

I am satisfied that the original seat of this disease is in the biflex canal. The sheep, in its wild state, inhabits high, dry mountainous districts. It is an animal of unsurpassed activity and agility, and the function of the biflex canal, while the sheep is in its wild condition, is probably of great importance, but in a domestic state the habits of the sheep are reversed; it becomes heavy, full-fed, and little disposed to exertion, and the gland referred to ceases to be of any importance, as its functions are not required. The natural consequence is, a tendency to morbid irritability, and a predisposition to disease. Hence, when a sheep is put upon damp or wet pasture, this gland is immediately affected, and disease will sooner or later be sure to follow. The only certain cure or preventive is eradication of the troublesome organ. The removal of this gland is not difficult, nor in a high degree painful. Its attachment to the contiguous tissues is very slight, and when loosened at its mouth, it may be withdrawn with little effort.

The operation is effected as follows: Insert a curved needle or tenaculum through the lips or sides of the mouth of the tube, and, raising it slightly with one hand, cut through the skin all around the raised mouth of the tube with a sharp knife or scalpel, and then gently draw the tube forth, seizing it with the thumb and finger of the hand which held the knife.

The gland having been removed, as above set forth, the limb should be dressed by filling the cavity with an ointment compounded of the following materials:

Tar, best quality, one pint; saturated tincture *Sanguinaria Canadensis*, one pint; *Hydrastis Canadensis*, one pint; sulphate copper, pulverized, four ounces: lard, one half pound. Boil together over slow fire for a few minutes; stir occasionally; cool.

After removing the biflex canal, as above described, and filling the cavity with the mixture, keep the sheep in a dry, clean pasture or yard for a few days, until the feet are healed, examining occasionally to see that the cavity does not become scabbed over or clogged, and repeating the application if necessary. In ten or fifteen days the sheep will be able to go to its usual pasturage.

The biflex canal may be destroyed by cauterizing, or in other ways, but those methods are uncertain, and much more liable to give rise to serious inflammations than the surgical operation described above.

The composition of the ointment or dressing given above may be varied, perhaps with benefit, and it does not enter into the matter claimed by me as my invention or discovery in this patent.

Other diseases, besides that known as foot-rot, have their origin in the biflex canal, and its extirpation will effect their cure. Among these is one known as "dry decay," of which the symptoms are a listless and sickly look; the sheep lags behind when the flock is in motion; the head and ears droop, and the sheep stumbles, as though weak and sore in its limbs; the wool looks harsh and dry; the eyes and nose run; and though the sheep eats well, it loses flesh, and looks old and worn; the feet and legs are cold, and feel like dead flesh; the skin looks pale, and puts on a peculiar, bloodless appearance; tumors appear about the jaws and head, which, when opened, discharge a clear, thick substance, resembling the white of eggs. This disease may last for months, but is almost sure to result in death if not arrested. An examination of the biflex canal shows clearly that the original seat of the disease is the same as foot-rot, and the same treatment will effect the cure.

Another disease of a chronic nature, called "scours" or diarrhœa, sometimes results from a diseased state of the biflex canal. This is also an obstinate and fatal disease, and can be most readily cured by removal of the gland.

There are other diseases which arise from the same source, and which yield permanently to the same treatment, and whenever the biflex canal appears to be involved in any degree, it should be removed. All of these affections, arising from the diseased condition of this canal, appear to be contagious, probably from the fact that at every step some of the standing grass is drawn between the cleft of the hoof and becomes contaminated, and the matter so removed from one sheep is liable to be communicated to the next one who crosses or follows the path of the first. But after extirpation of the gland, sheep are no more liable to disease, and do not require change of pasture more than other stock.

What I claim as new, is—

The above-described mode of treating diseased sheep having "foot-rot," "dry decay," "scours," &c., i. e., by extirpating the biflex canal, in the mode and by the process herein described.

GEORGE WILSON.

Witnesses:
JOSEPH VANATTA,
R. E. HUSTEN.